United States Patent [19]
Pizzuti et al.

[11] 4,084,168
[45] Apr. 11, 1978

[54] FLASH UNIT DIFFUSER MECHANISM FOR PHOTOGRAPHIC CAMERAS

[75] Inventors: Donato F. Pizzuti, Saugus, Mass.; Irving S. Lippert, Lexington, both of Mass.

[73] Assignee: Polaroid Corporation, Cambridge, Mass.

[21] Appl. No.: 719,844

[22] Filed: Sep. 2, 1976

[51] Int. Cl.² ..................... G03B 15/02; G03B 17/04
[52] U.S. Cl. .................................. 354/126; 354/187; 354/202; 354/295
[58] Field of Search ............... 354/126, 143, 144, 187, 354/192–194, 202, 295

[56] References Cited
U.S. PATENT DOCUMENTS
3,709,119  1/1973  Van Der Meer .................... 354/81

*Primary Examiner*—John Gonzales
*Attorney, Agent, or Firm*—David R. Thornton

[57] ABSTRACT

A foldable diffuser for flash units mounted on photographic cameras and mechanism by which such a diffuser is moved automatically between collapsed and erected positions with respect to a flash unit mounting receptacle. The diffuser is pivoted on an axis normal to the front face of a shutter housing in a collapsible camera such that it lies against the front face in the folded position and swings out over a side face of the shutter housing in front of a flash unit mounted on the side face in the erected position. Movement to the collapsed position is effected by the erecting linkage of the camera against a pivotal bias on the diffuser.

17 Claims, 8 Drawing Figures

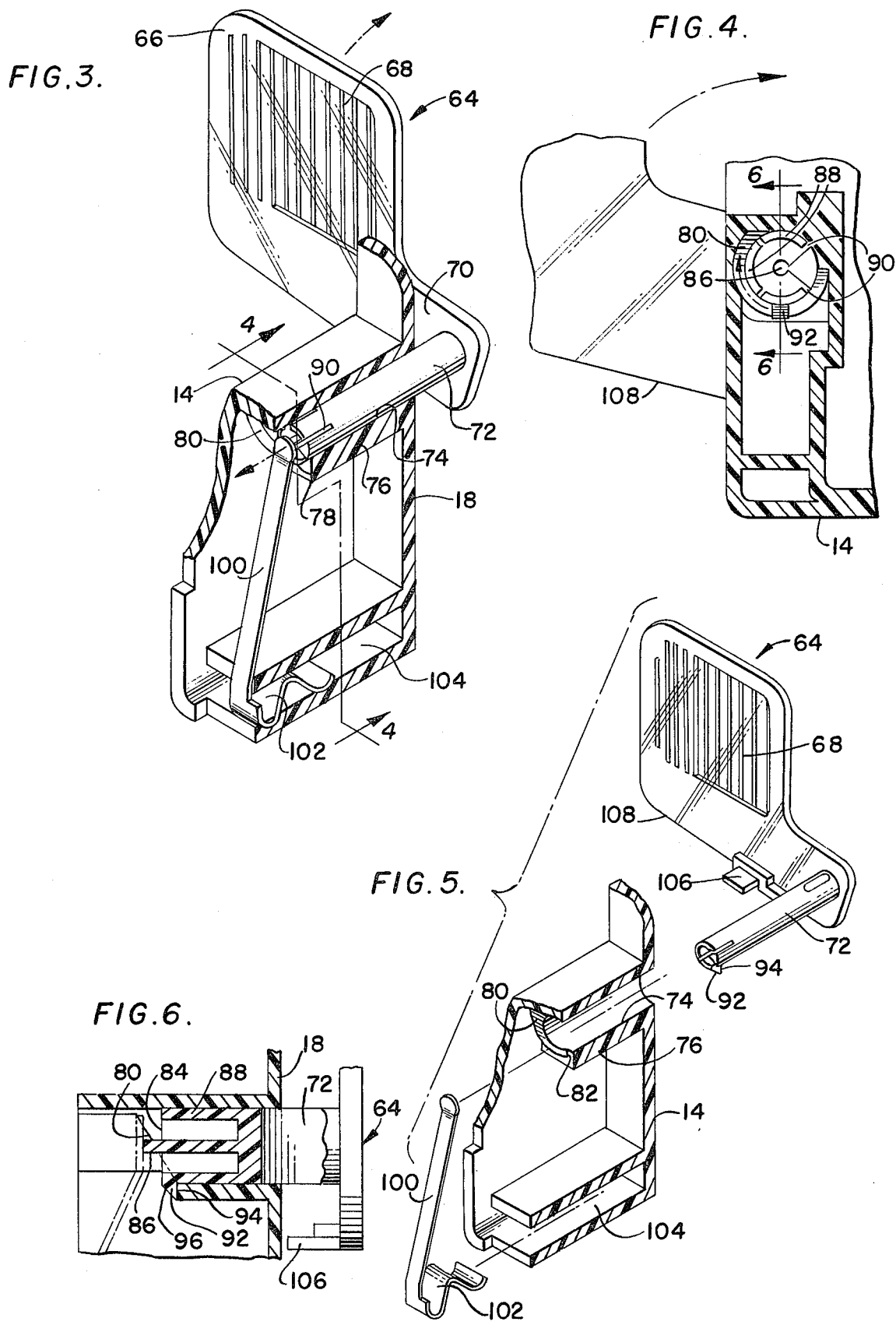

FLASH UNIT DIFFUSER MECHANISM FOR PHOTOGRAPHIC CAMERAS

BACKGROUND OF THE INVENTION

This invention relates to photographic cameras and more particularly, it concerns a flash lamp diffuser retracting and erecting mechanism for use primarily, though not exclusively, in collapsible bellows type cameras.

Collapsible cameras for large format films conventionally include a back housing for supporting film in a position to be exposed through a lens aperture in a shutter housing connected to the back housing by a foldable bellows. The shutter housing is supported by an erecting linkage in a manner facilitating its movement between a collapsed condition against the back housing and an erect or operative condition in which the lens is properly spaced from and aligned with the film in the back housing. The bellows, being foldable, provides light-tight enclosure between the respective housings at all times. Also a protective cover is usually associated with the erecting linkage in a manner to pivot between a closed position over the shutter housing and bellows in the collapsed condition of the camera and an open position upon erecting the camera for operation.

The shutter housing of such cameras typically contains apparatus for determining the parameters for film exposure, such as a shutter and lens aperture stopping means as well as electrical equipment usually including a light meter and/or an automatic exposure control system. Because of the supply of electrical current available as well as the proximity of shutter synchronization switching, it is common practice to mount a flash illumination receptacle also on the shutter housing. The connection of such receptacles to a remote flash lamp mounted on the back housing or elsewhere on the camera and using an electric cord equipped with an appropriate plug is well-known in the art. Collapsible cameras have also incorporated receptacles for rotatable, multi-flash units known as "flash cubes."

Commercially available flash cubes are accepted as desirable because of the facility they provide for making multiple flash exposures without requiring replacement of the unit for each such exposure. In large format cameras, however, flash cubes are most advantageously used with a diffuser by which the illumination emanating from each flash unit will be spread over a sufficiently large area to assure proper exposure of the complete area of the film to be exposed. Because the diffuser is physically embodied in plate-like shield positioned in front of the flash cube, it also serves a measure of protection against accidental flash unit explosion or shattering.

In collapsible cameras of the type referred to, the proximity of the shutter and electric circuitry in the shutter housing, gives rise to economic advantages in mounting a flash cube on the shutter housing. Also the provision of a flash cube receptacle on the shutter housing serves to protect the receptacle as a result of its being enclosed by the cover of the camera when the latter is in a collapsed condition. In view of the space limitations about the shutter housing in a collapsed bellows camera, however, it is difficult to accommodate a flash diffuser. Although the diffuser might be hinged or otherwise folded against a face of the shutter housing, use of the diffuser in practice will be insured only if it is properly positioned automatically when the camera is erected and thus conditioned to receive a flash cube.

SUMMARY OF THE PRESENT INVENTION

In accordance with the present invention, a mechanism is provided for folding and erecting a flash lamp diffuser shield between a retracted position compactly against the front face of a collapsible camera shutter housing and an operative position in which the shield is located in front of a flash lamp or cube inserted into a socket located on one side of the shutter housing. In the operative erect position, the shield is also positioned forwardly of the shutter housing front face to accommodate the corners of a flash cube when it is rotated to present the successive flash units thereof to a position flush with the front face of the shutter housing. The diffuser is associated with the erecting linkage of the camera in such a manner that it will be positioned automatically by adjusting the camera between the collapsed and erected conditions.

Among the objects of the present invention are therefore: the provision of an improved light diffusing mechanism for photographic cameras; the provision of such a mechanism in which a diffusing shield is properly positioned automatically upon erection of a collapsible camera; the provision of such a light diffusing shield arrangement which is foldable to a position in which it does not compromise compactness of the collapsed camera; and the provision of such a light diffusing shield arrangement which is easily and inexpensively manufactured as well as assembled with the shutter housing of photographic cameras.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 3 is an enlarged cutaway perspective view illustrating the diffuser mounting arrangement of the present invention;

FIG. 4 is an enlarged fragmentary cross-section on line 4—4 of FIG. 3;

FIG. 5 is an exploded perspective view illustrating the component shown in FIG. 3;

FIG. 6 is a fragmentary cross-section on line 6—6 of FIG. 4;

DETAILED DESCRIPTION OF THE PREFERRED EMBODIMENTS

Figure 1:
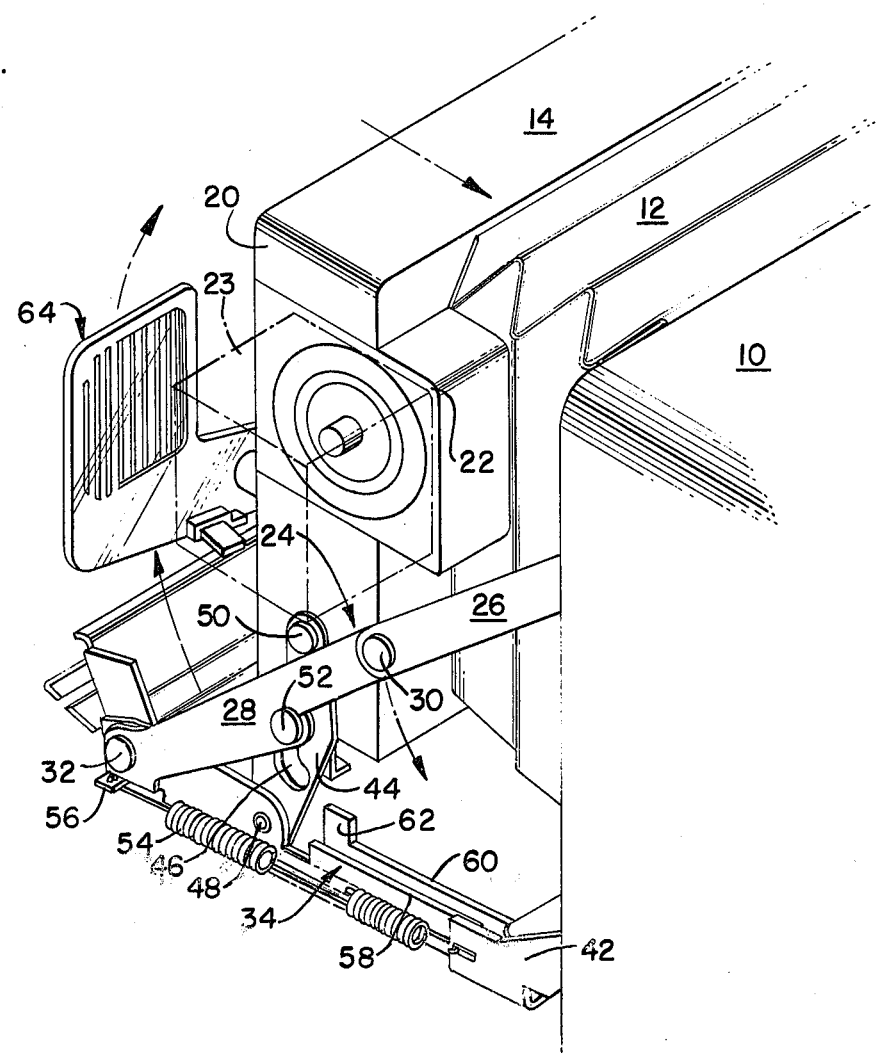
FIG. 1 is a fragmentary perspective view illustrating the flash lamp diffuser of the present invention in an operative position on an erected collapsible camera.

In FIGS. 1, 2, 7 and 8 of the drawings, a large film format collapsible camera is shown to include a back or film housing 10 connected by a foldable bellows 12 to a forwardly disposed shutter housing 14. The shutter housing 14 carries an objective lens 16 on the front face 18 thereof and otherwise contains exposure parameter deliminating equipment by which a film (not shown) contained in the back housing 10 may be properly exposed when the camera is in an erected condition as shown in FIG. 1, for example. The shutter housing 14 also supports on one side 20 thereof, a flash cube mount or receptacle 22 adapted to receive a flash cube 23 shown in FIG. 1 by phantom lines. Also, the receptacle is of generally rectangular configuration with one side essentially flush with the front face 18 of the shutter housing 14. The flash cube receptacle 22, in and of itself, is conventional and adapted to receive a standard flash cube in a manner such that each of four flash units in the cube will be successively presented at the front of the camera by rotation thereof through 90° increments.

Figure 7:
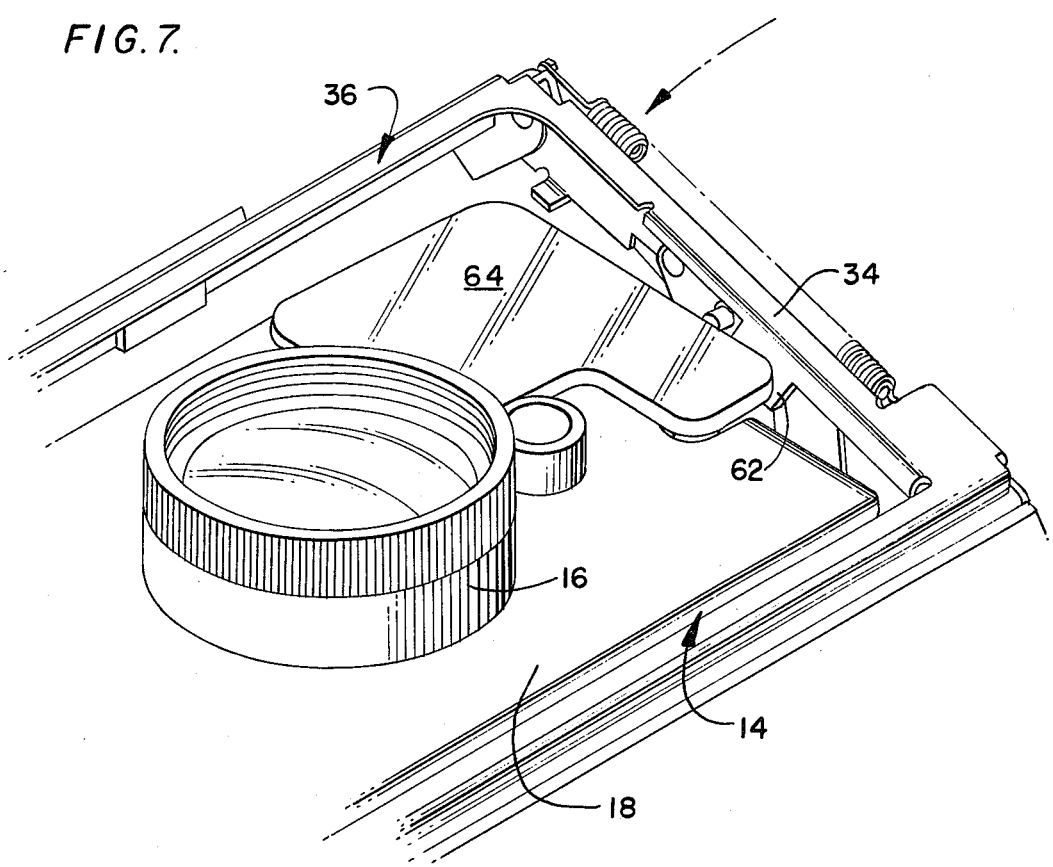
FIG. 7 is a fragmentary perspective view of the camera incorporating the diffuser plate of the present invention with the protective camera cover removed and with the erecting linkage nearing a collapsed condition.
Figure 8:
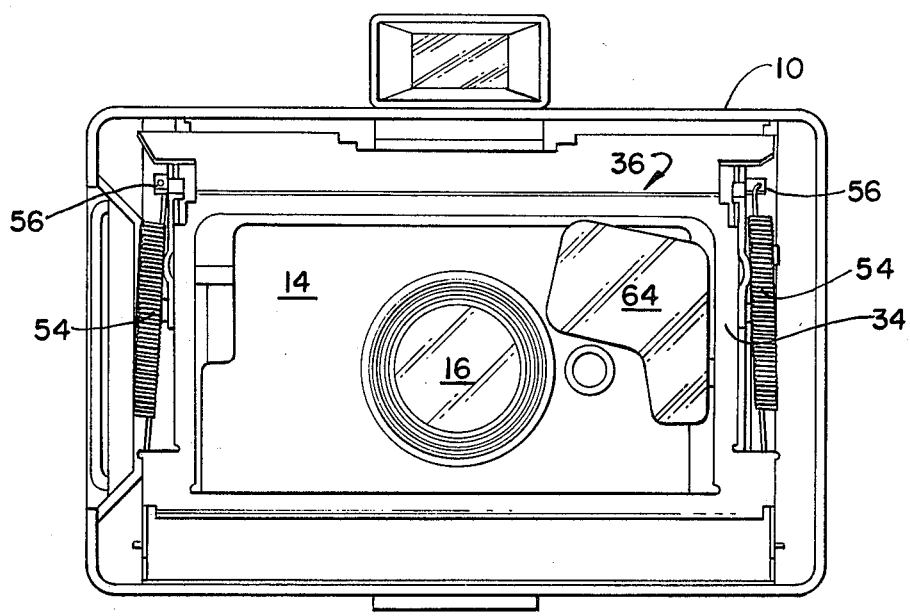
FIG. 8 is a front elevation of a camera incorporating the diffuser shield of the present invention, again with the front protective cover of the camera removed.

The shutter housing 14 is movable between the erected position thereof shown in FIG. 1 to a collapsed position shown in FIG. 8 in which it is in close proximity with the film housing 10 against the folded or collapsed bellows 12. Such relative movement of the shutter housing 14 with respect to the film housing 10 is effected by an erecting linkage designated generally by the reference numeral 24. The linkage 24 is preferably duplicated on opposite sides of the camera and includes on each side, an upper link 26 pivoted from the front of the film housing 10 and pivotally connected at its projecting end to a lower link 28 by pin 30. The lower link 28, in turn is pivotally connected by a pin 32 to the front end and on the outside of a side member 34 formed as an integral portion of a rectangular cover supporting frame 36 (see FIGS. 7 and 8). The frame 36 as well as a cover 38 connected thereto (FIG. 2) is hinged from the back housing 10 by bracket supported pins 40 engaged pivotally with rear extensions 42 on the side members 34. A cam link 44 having a cam slot 46 is pivoted by a pin 48 at its lower end to the side member 34 and at its other end by pin 50 to a plate (not shown) which mounts the front housing 14. A pin 52 mounted in the lower link 28 functions as a follower in the cam slot 46 to control movement of the cam link 44 in accordance with pivotal movement of the links 26 and 28. Also a latch means (not shown) secures the shutter housing 14 at a point spaced from the pin 50 so that it is positioned positively in the operative or erected condition of the camera. A tension spring 54 extending from the back of the side members 34 to a tab 56 facilitates erecting movement of the links 26 and 28 past a dead-center position so that the erected condition of the camera is retained.

It will be noted that the side members 34, as shown in FIG. 1, are of channel shaped configuration over at least the rear portion of their length so as to define inner and outer flanges 58 and 60 respectively. This channel shaped configuration of the side members 34 allows the cam links 44 to fold into the space between the respective flanges 58 and 60. The links 26 and 28, on the other hand, fold in a plane located outside the plane of the side members 34. The plane of the links 26 and 28 as well as the swing plane of the side member 34 are both parallel and lie close to the side face of the shutter housing. Also it will be noted that the forward end of the inner flange 58 terminates in an upstanding tab 62 for reasons which will be described in more detail below.

Figure 2:
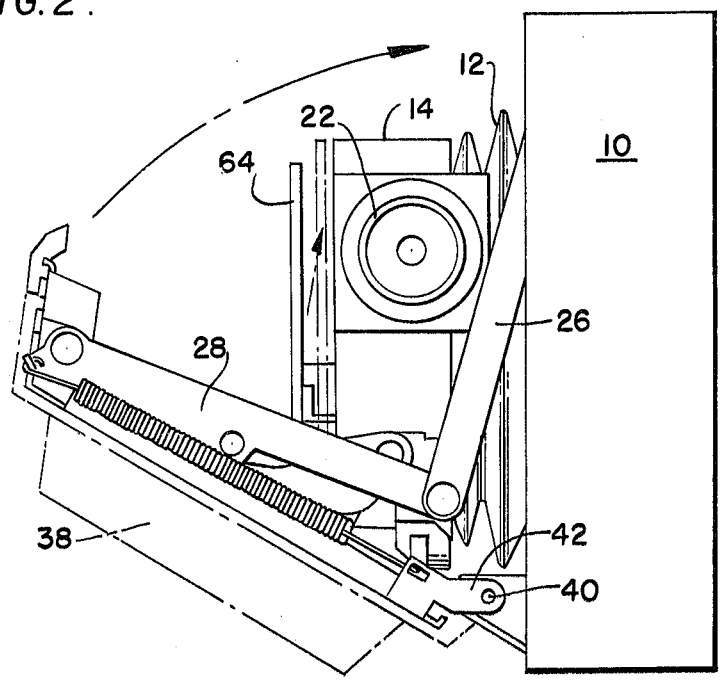
FIG. 2 is a side elevation of the camera shown in FIG. 1 during the adjustment thereof to a collapsed condition.

In the operation of the linkage 24 to adjust the camera from the erect condition illustrated in FIG. 1 to the collapsed condition shown for example in FIG. 8, the links 26 and 28 are pivoted toward the position shown in FIG. 2 causing the cam link 44 to move into the space between the flanges 58 and 60 of the member 34 and pivoting the frame 36 and cover 38 upwardly against the back housing 10 over the lens 16 and shutter housing 14. This operation is essentially reversed in adjusting the camera from the collapsed condition to the erected condition. Although it is contemplated that the particular linkage employed for adjusting the respective conditions of the camera may be modified from that shown, it will be apparent that the space available about the shutter housing 14 with the camera in the collapsed condition shown in FIG. 8 is limited so that the flash cube 23 must be removed from the socket 22 when the camera is collapsed.

In accordance with the present invention, a collapsible camera as thus described, is provided with a flash cube diffuser generally designated in the drawings by the reference numeral 64. As shown most clearly in FIGS. 3-6 of the drawings, the flash cube diffuser is defined by a plate-like member of transparent material having a shield portion 66 with a central lens area 68 embossed therein and joined integrally with a coplanar arm portion 70. The diffusing lens area 68 is conventional and as such, functions to diffuse or spread light emanating from the flash cube and projected forwardly through the lens area 68.

The arm portion 70 is supported by a rearwardly extending shaft 72 which may be integrally molded with the diffuser 64 or otherwise secured to the arm portion such as by an adhesive, thermal or ultrasonic fusion and the like. The shaft 72 projects rearwardly at right angles to the plane of the diffuser and is received rotatably in a cylindrical bearing aperture 74 defined by boss portion 76 projecting rearwardly from the front face 18 of the shutter housing 14 and on an axis normal to the face 18. The cylindrical bearing aperture 74 opens through the rear-end 78 of the boss portion on which is formed a helical camming ramp 80 co-axial with the bearing aperture and extending upwardly from a detent 82. In the context of a clock-face frame of reference as viewed from the rear end face 78 of the boss portion 76, the surface 80 extends from the detent 82 at 6 o'clock and is pitched to the rear.

The shaft 72 is shaped at its rear end portion 84 to define a central projecting pin 86 spaced annularly from quadrant fingers 88 defined by slots 90. The fingers 88 are thus capable of some measure of flexure for assembly in a manner to be described below. One of the segments 88 is provided with a radially projecting cam follower lug 92 having a forwardly disposed radial follower face 94 and an inclined rear ramp face 96 as shown in FIGS. 5 and 6. The pin 86 is engaged by the projecting end of a leaf spring 100 cantilevered from a mounting base 102 received in an appropriately shaped well 104 in the shutter housing 14.

As shown in FIGS. 1, 5 and 6 of the drawings, a rearwardly projecting somewhat flexible tab 106 is mounted on the diffuser 64 to extend downwardly from the lower essentially linear edge 108 thereof and which is common to both the shield portion 66 and the arm portion 70. The tab 106 serves a camming and folded position retention function in cooperation with the erecting linkage of the camera in a manner which will become clear from the description of operation to follow.

Because of the flexible fingers 88 at the rear end 84 of the shaft 72, the diffuser 64 may be mounted to the shutter housing 14 simply by inserting the shaft 72 into the cylindrical bearing aperture 74. The ramp surface 96 on the lug 92 will cause the segment 88 on which it is mounted to flex inwardly until the camming face 94 on the lug 92 is aligned with the base of the detent 82. When so inserted, the lug 92 will snap outwardly to the position shown in FIG. 6, for example. Also such inward insertion will flex the spring 100 so that a forward bias wil be exerted on the shaft 72. As a result of the relative axial length of the shaft 72 and the bearing aperture between the detent 82 and the front face 18 of the housing 14, the diffuser 64 will be positioned forwardly of the front face 18 of the shutter 14. Because of the angular position of the detent and the lug 92, the diffuser 64 will also be located in front of the flash cube 23 when mounted in the receptacle 22. This positioning, of course, presumes that the camera is in the erected condition as shown in FIG. 1 of the drawings.

With reference to FIGS. 2, 7 and 8 of the drawings, it will be noted that as the camera is adjusted from the erected condition shown in FIG. 1 to the collapsed condition shown in FIG. 8, the lower link 28 of the erecting linkage will initially engage the edge 108 of the diffuser 64 to pivot the diffuser upwardly about the axis of the shaft 72. As a result of such pivotal movement of the shaft 72, the lug 92 will ride along the helical camming ramp 80 such that upward pivotal movement of the diffuser will result also in rearward movement between the positions depicted by solid and phantom lines respectively in FIG. 2, for example.

Continued collapsing movement of the camera and pivotal movement of the cover frame 36 will result in a correspondingly continued pivotal movement of the diffuser until the frame 36 reaches the approximate position shown in FIG. 7 of the drawings. At this position, the upstanding tab 62 on the flange 60 of the frame side member 34 engages the tab 106 at the edge of 108 of the diffuser plate to fold the diffuser so that it will lie within the inner edge of the side member 34 as defined by the flange 60. In the fully collapsed condition of the camera, the side member 34 of the frame 36 will have moved past the plane of the front face 18 to be positioned laterally adjacent to the side face 20 of the housing 14. Thus in this position of the frame, the tab 62 on the arm 34 will engage the tab 106 on the diffuser to hold the diffuser in the position shown in FIG. 8. Because of the helical ramp 80 and follower lug 92, the diffuser will be moved against the front face 18 of the shutter housing. Adjusting the position of the camera from the collapsed position shown in FIG. 8 to the erected position of FIG. 1 is essentially a reversal of the operation described. Accordingly, the diffuser will be moved to its operative, erected condition or folded automatically upon respective erecting or collapsing adjustment of the camera.

It will be appreciated, therefore, that by this invention there is provided a unique flash lamp diffuser and diffuser retracting mechanism for use particularly with collapsible cameras and by which the above-mentioned objectives are completely fulfilled. It is contemplated that various modifications and/or changes may be made in the disclosed embodiment without departure from the inventive concept manifested thereby. Accordingly, it is expressly intended that the foregoing description is illustrative of a preferred embodiment only, not limiting, and that the true spirit and scope of the present invention will be determined by reference to the appended claims.

We claim:

1. A photographic camera comprising:
   a housing having a front face, a side face and a flash unit receptacle on said side face;
   cover means movable between a closed position enclosing the side face of said housing and an open position clear of said housing and said side face;
   a light diffusing element; and
   means supporting said light diffusing element for movement between a retracted position overlying said front face of said housing and an erected position extending beyond said side face in front of said flash unit receptacle automatically upon movement of said cover means between said closed and open positions respectively.

2. The apparatus recited in claim 1 wherein said light diffusing member comprises a plate-like member having co-planar shield and arm portions.

3. The apparatus recited in claim 2 wherein said supporting means comprises a pivot shaft projecting perpendicularly from said arm portion and means defining a bearing aperture in said housing to receive said shaft, the axis of said bearing aperture being normal to the front face of said housing.

4. The apparatus recited in claim 3 further including a helical ramp co-axial with said bearing aperture and a follower lug on said shaft cooperable with said ramp.

5. The apparatus recited in claim 4 including spring means to bias said shaft forwardly in said bearing aperture, said ramp being pitched to cause said forward bias to result in a yieldable rotational force urging said diffuser member to said erect position.

6. The apparatus recited in claim 5 wherein said ramp is spaced from said front face by a distance related to the length of said shaft between said lug and said plate-like member and pitched so that said member is retracted along the axis of said bearing aperture during pivotal movement thereof from said erected to said retracted position.

7. The apparatus recited in claim 1 wherein said supporting means positions said light diffusing element in substantially close adjacency to said front face of said housing when said light diffusing element is in its said retracted position and said supporting means additionally include means for displacing said light diffusing element a predetermined distance in a direction further away from said front face automatically upon movement of said cover means between its said closed and open positions.

8. A collapsible camera comprising:
   a film housing;
   a shutter housing adjustable with respect to said film housing between a collapsed condition positioned against said film housing and an erected condition spaced from said film housing, said shutter housing having front and side exterior faces;
   cover means pivotal between an open position and a closed position against said film housing to enclose said shutter housing;
   a flash unit mounting receptacle on a side face of said shutter housing;
   articulated linkage means extending between said film housing and said cover means and foldable in a plane parallel to and near the side face of said shutter housing on which said flash unit mounting receptacle is mounted;
   diffuser plate means moveable on a pivotal axis normal to the front face of said shutter housing between a retracted position overlying said front face of said shutter housing and an erected position extending beyond said side face in front of said flash unit mounting receptacle; and means for moving said diffuser plate automatically between said retracted and erected positions during adjustment of said shutter housing between said collapsed and erected conditions, respectively.

9. The apparatus recited in claim 8 wherein said last mentioned means comprises yieldable biasing means urging said diffuser plate to said extended position, said diffuser plate having an edge portion engagable by said linkage to move said plate to said retracted position against said biasing means.

10. The apparatus recited in claim 9 comprising a pivot shaft supporting said diffuser plate on said pivotal axis, said yieldable biasing means comprising a spring supported by said shutter housing to exert an axial bias on said pivot shaft, and means for resolving said axial bias to pivotal torque along said axis.

11. The apparatus recited in claim 10 wherein said resolving means comprises helical ramp means on said housing concentric with said pivotal axis and ramp follower means on said pivot shaft.

12. The apparatus recited in claim 11 wherein said axial bias on said pivot shaft is in a direction along said axis outwardly of a front face of said shutter housing said ramp being spaced rearwardly from said front face by a distance related to the length of said pivot shaft between said follower means and said diffuser plate and pitched so that said diffuser plate is retracted along said pivotal axis during movement of said plate from said erected to said retracted position.

13. The apparatus recited in claim 8 wherein said cover means comprises a frame having side members moveable past said front face of said shutter housing to be positioned laterally adjacent to the side faces thereof in said collapsed condition.

14. The apparatus recited in claim 13 wherein said diffuser plate moving means comprises yieldable biasing means urging said diffuser plate to said extended position, said diffuser plate having an edge portion engageable by said linkage to move said plate to said retracted position against said biasing means.

15. The apparatus recited in claim 13 wherein said linkage means is foldable in a plane outside of said frame side members, said frame member having an inner flange portion engageable with the edge portion of said diffuser plate during terminal movement of said frame toward the collapsed condition of said camera.

16. The apparatus recited in claim 15 wherein said diffuser plate comprises a rearwardly projecting tab flush with said edge portion and cooperable with said inner flange portion of said frame side member during terminal movement of said frame member in adjustment to said collapsed condition.

17. The apparatus recited in claim 16 in which said inner flange portion of said side member is formed with a tab to engage said rearwardly projecting tab on said diffuser plate.

* * * * *